United States Patent [19]
Goto et al.

[11] Patent Number: 6,078,563
[45] Date of Patent: Jun. 20, 2000

[54] DISK CARTRIDGE CAPABLE OF TAKING OUT A DISK

[75] Inventors: Yoshikazu Goto, Hirakata; Yukio Nishino, Ikoma-gun; Kuniko Nakata, Kadoma, all of Japan

[73] Assignee: Matsushita Electric Industrial Co., Ltd., Osaka, Japan

[21] Appl. No.: 09/310,697

[22] Filed: May 5, 1999

Related U.S. Application Data

[62] Division of application No. 08/710,732, Sep. 20, 1996, Pat. No. 5,917,803.

[30] Foreign Application Priority Data

Sep. 21, 1995 [JP] Japan .................................. 7-242867

[51] Int. Cl.[7] .............................................. G11B 23/03
[52] U.S. Cl. ........................................ 369/291; 360/133
[58] Field of Search ............................ 369/291; 360/133; 206/308.1

[56] References Cited

U.S. PATENT DOCUMENTS

| | | | |
|---|---|---|---|
| 5,150,354 | 9/1992 | Iwata et al. | 369/291 |
| 5,293,293 | 3/1994 | Iwata et al. | 360/133 |
| 5,748,609 | 5/1998 | Tanaka | 369/291 |
| 5,796,713 | 8/1998 | Tanaka | 369/291 |
| 5,825,747 | 10/1998 | Tanaka | 369/291 |
| 5,903,541 | 5/1999 | Mizutani et al. | 369/291 |
| 5,910,941 | 6/1999 | Mizutani | 369/291 |
| 5,917,803 | 6/1999 | Goto et al. | 369/291 |

FOREIGN PATENT DOCUMENTS

| | | |
|---|---|---|
| 0-335461 | 10/1989 | European Pat. Off. . |
| 0-368347 | 5/1990 | European Pat. Off. . |
| 0-421775 | 4/1991 | European Pat. Off. . |
| 0-617425 | 9/1994 | European Pat. Off. . |
| 0-691653 | 1/1996 | European Pat. Off. . |
| 0-768662 | 4/1997 | European Pat. Off. . |
| 7-123420 | of 0000 | Japan . |
| 1-232588 | 9/1989 | Japan . |
| 1-159274 | 11/1989 | Japan . |
| 5-242626 | 9/1993 | Japan . |
| 2-272990 | 6/1994 | United Kingdom . |

*Primary Examiner*—William Klimowicz
*Attorney, Agent, or Firm*—Ratner & Prestia

[57] ABSTRACT

The disk cartridge adapted for permitting the removal of a disk comprises a case having a disk slot for receiving a disk, an opening provided so that a disk motor and pickup can be inserted into the disk case, a disk access provided between two adjacent side walls of the case to communicate with the disk slot allowing the disk to pass through the slot, and a lid rotatably supported on the case for opening and closing the disk access, in which a disk guide passage is formed so that, when the lid is open, the disk moves a specific distance along the inner surface of the side wall of the case, abuts against the lid to change the moving direction of the disk, and is discharged from the disk access.

7 Claims, 15 Drawing Sheets

DISK CARTRIDGE CAPABLE OF TAKING OUT A DISK

This application is a division of U.S. patent application Ser. No. 08/710,732, filed Sep. 20, 1996, now U.S. Pat. No. 5,917,803.

The entire disclosure of U.S. patent application Ser. No. 08/710,732, now U.S. Pat. No. 5,917,803 filed Sep. 20, 1996 is expressly incorporated by reference herein.

BACKGROUND OF THE INVENTION

1. Field of the Invention

The present invention relates to a disk cartridge used in an optical disk information memory device such as data file device and image file device, and the disk cartridge capable of taking out an optical disk which can take out, for example, a recording optical disk.

2. Related Art of the Invention

Optical disks may be classified into read-only optical disks such as CD and CD-ROM, and recording optical disks. Most read-only optical disks are sold as bare disks without cartridge. On the other hand, recording optical disks are sold in cartridge to prevent deposit of dust or fingerprint on the disk surface. This recording optical disk contained in the cartridge cannot be taken out of the cartridge structurally.

Accordingly, the optical disk devices are available in reproducing only devices for loading bare disks only, and recording and reproducing devices for loading the cartridge type only. And recently, there is an increasing demand of reproducing the read-only bare disk in the recording and reproducing device capable of loading only the cartridge type, or reproducing the recording optical disk contained in the cartridge in the reproducing only machine for bare disks.

To realize the former request, the following method may be considered. That is, a bare disk is put in a cartridge capable of taking out a cartridge in the same shape and dimensions as the recording cartridge to change into a cartridge type, so that it can be reproduced in the recording and reproducing device. An example of the cartridge capable of taking out the disk to enable this method is disclosed in Japanese Laid-open Utility Model 1-159274, which is further described later On the other hand, to realize the latter request, the following method may be considered. That is, in the disk cartridge capable of taking out the disk as explained as the means for realizing the former request, the optical disk for recording is accommodated, and it is loaded into the recording and reproducing device to record desired data into the recording optical disk. This recording optical disk is once taken out of the cartridge, and reproduced by the reproducing only device.

As mentioned above, an example of prior art of disk cartridge capable of taking out a disk disclosed in Japanese Laid-open Utility Model 1-159274 is described structurally by referring to FIG. 17.

In FIG. 17, a disk 101 is a read-only optical disk such as CD-ROM. A case main body 102 is for accommodating the disk 101, and is composed by coupling upper and lower halves of same shape. FIG. 17 shows the state of the disk 101 being accommodated in the case main body 102. In the diagram, only the lower half 103 is shown, and the upper half is not visible because it is at the back side of the lower half 103. In the case main body 102, a disk access 104 for allowing to pass the disk 101 is provided at the back side. Inside the case main body 102, a guide passage leading from the initial accommodating position of the disk 101 up to the disk access 104 is formed straightly. This guide passage is formed along lateral walls 105a, 105b, and is a wide passage slightly wider than the diameter of the disk 101. Reference numeral 106 is a lid for opening and closing the disk access 104, and its one end is rotatably supported in a rotary concave part 107 near the disk access 104 of the case main body 102. At the other end of the lid 106, a flexible deforming hook 108 provided near the lateral wall 105a of the case main body 102 is stopped, and an elastic clasp 109 for fixing and holding the lid 106 on the case main body 102 is formed. Reference numeral 110 is a handle attached to the lid 106, and it is engaged with a notch 111 in the case main body 102. On the top of the lower half 103, although not shown, there is an opening for inserting a pickup and a disk motor. Reference numeral 112 is a shutter composed of two pieces for opening and closing the opening, and its leading end is guided and held by a shutter holder plate 113 fixed on the lower half.

In thus constituted cartridge of the prior art, the action for taking out the disk is described.

When the handle 110 of the lid 106 is pulled by hand, the plastic clasp 109 or hook 108 is elastically deformed in a direction of disengaging the elastic clasp 109 and hook 108, and the lid 106 rotates about the rotary concave part 107. After rotating the lid 106 to the rotating position where the disk 101 discharged from the disk access 104 does not contact, the cartridge is inclined, and the disk 101 is allowed to slide by gravity in the case main body 102 to be discharged from the disk access 104. At this time, keeping the hand waiting near the disk access 104, the discharged disk 101 is received, and the disk 101 is picked by fingers, and the disk 101 is drawn out from the disk access 104, thereby finishing the action of taking out the disk.

On the other hand, to put back the removed disk 101 into the cartridge, a reverse action of the above action of taking out the disk is done.

Thus, the read-only optical disk can be reproduced in the recording and reproducing device capable of loading only the cartridge type.

However, in such disk cartridge capable of taking out the disk in the prior art, since the disk is discharged from the disk accommodating part straightly to the disk access, it is required to keep the hand waiting near the disk access when taking out the disk, and receive the disk sliding down from the disk access, and the user must be familiar with the disk discharging operation, and there is a problem in ease of operation.

Moreover, in the disk discharging operation, it is possible that the disk information side may be touched by finger. In the read-only optical disk such as CD-ROM, it does not matter particularly if fingerprint is deposited on the information side of the disk, but in the case of optical disk for recording, if fingerprint is left over on the information side of the disk, possibility of recording failure is high.

Therefore, if the cartridge capable of taking out the disk in the above constitution is directly used as the cartridge for handling an optical disk for recording, fingerprint is likely to be formed on the optical disk as mentioned above, and recording failure is likely to occur when recorded by putting the optical disk for recording back into the cartridge.

Besides, the width of the cartridge must be wider than the diameter of the disk 101 by the portion of the occupied area of the lid 106 near the rotary concave part 107, and dead space is formed in the cartridge, and the efficiency is poor. In particular, if the width of the conventional cartridge not capable of taking out the disk is close to the diameter of the disk, it is difficult to set the width of the cartridge capable of taking out the disk equal to the width of the conventional cartridge not capable of taking out the disk, and it is hard to realize compatibility of both shapes.

SUMMARY OF THE INVENTION

It is hence a primary object of the invention to present a disk cartridge capable of taking out a disk, featuring easier operation to take out the disk than in the prior art and resistance to contamination such as fingerprint. It is a further object to present a disk cartridge capable of taking out a disk, having no dead space in the cartridge, and compatible in shape with a conventional cartridge not capable of taking out a disk.

In order to attain the object, the first invention is a disk cartridge capable of taking out a disk which comprises:

a case main body of a substantially rectangular form having a disk accommodating part for accommodating a disk, and an opening provided so that disk driving means for rotating and driving the accommodated disk can be inserted into the disk accommodating part from outside, shutter means having a shielding plate for opening and closing the opening, a disk access provided at an end surface of the case main body to communicate with the disk accommodating part so that the disk can be taken in and out, a lid for opening and closing the disk access, and move suppressing/stopping means for suppressing or stopping a move when the disk has moved a specific distance toward the outside when the disk is taken outside through the disk access from the case main body.

The second invention is a disk cartridge capable of taking out a disk according to the first invention,
wherein the move suppressing/stopping means possesses an abutting part at a position of suppressing or stopping the straight move of the disk in the direction determined by a guide portion extended from a disk accommodation initial position of the disk accommodating part toward the disk access.

The third invention is a disk cartridge capable of taking out a disk according to the second invention,
wherein the abutting portion is provided in at least one position so as to abut against an outer circumferential end of the disk substantially from one side when the disk is taken outside, and there is no abutting portion except for this abutting portion of the outer circumferential end when the outer circumferential end abuts against the abutting part.

The fourth invention is a disk cartridge capable of taking out a disk according to the second invention,
wherein the abutting part is provided in at least two positions so as to abut against the outer circumferential end of the disk substantially from both sides at the same time when the disk is taken outside, and one or both of the abutting parts can be deformed elastically.

The fifth invention is a disk cartridge capable of taking out a disk according to the third invention,
wherein the lid is supported so as to be rotatable in a specified range at an end of the case main body, and the abutting part is provided at specified position of the lid, and the abutting part is provided so that the outer circumferential end of the disk once abuts against the abutting part and then the moving speed of the disk is lowered than before abutting when the lid is opened and the disk has move the specified distance in the direction determined by the guide portion by gravity.

The 6th invention is a disk cartridge capable of taking out a disk according to the fourth invention,
wherein the lid is supported so as to be rotatable in a specified range at an end of the case main body, and one of the two abutting parts is provided at a specified position of the lid, and the other is provided near the disk access of the case main body, and one or both of the abutting parts are deformed elastically, when the lid is opened and the disk has move the specified distance in the direction determined by the guide portion by gravity, so that the outer circumferential end of the disk abuts against the both abutting parts simultaneously, and then the disk moves more slowly than before abutting or stops temporarily.

The 7th invention is a disk cartridge capable of taking out a disk according to the 6th invention, wherein the lid possesses a lock member to be fixed to the case main body with the disk access closed, and the abutting part provided in the lid is deformed elastically by abutting against the case main body with the lid closed, and the abutting part maintains the thrusting force for rotating the lid in the opening direction when the locked state of the case main body and the lock member is cleared, by the elastic deformation in the closed lid state.

The 8th invention is a disk cartridge capable of taking out a disk according to any one of the first to 7th inventions, wherein the disk access is formed from one end surface to other end surface adjacent to this end surface, out of substantially four end surfaces of the case main body.

The 9th invention is a disk cartridge capable of taking out a disk according to the second invention,
wherein the disk has a central hole, and the abutting part is constituted so that the central hole of the disk may be exposed outside from the case main body when the disk at the position of abutting against the abutting part.

The 10th invention is a disk cartridge capable of taking out a disk according to the 9th invention,
wherein the case main body has a concave part at a position of exposing the central hole of the disk to outside from the case main body when the disk at the position of abutting against the abutting part, and the lid has a handle for closing the concave part when the disk access of the case main body is closed.

The 11th invention is a disk cartridge capable of taking out a disk according to the first invention,
wherein a concave part or a penetration hole is formed in one of the case main body and lid, and a convex part to be fitted into the concave part or penetration hole is formed in the other, so that the lid may be fitted and fixed into the case main body, with the disk access of the case main body closed by the lid, and the convex part is formed integrally on the case main body or the lid so as to be removed from outside.

The 12th invention is a disk cartridge capable of taking out a disk according to the 11th invention,
wherein it is possible to judge whether the disk is once removed outside from the case main body by the presence or absence of the convex part.

The 13th invention is a disk cartridge capable of taking out a disk according to the 12th invention,
wherein the case main body has openings at both sides, the convex parts are formed on both sides of the lid, and detecting means provided in an external device for detecting presence or absence of the convex parts can detect one of the two convex parts when the disk cartridge is loaded in the external device by its surface side or back side.

The 14th invention is a disk cartridge capable of taking out a disk according to the 12th invention,
wherein the convex part is formed integrally on the lid, and the lid and the case main body are different in color.

The 15th invention is a disk cartridge capable of taking out a disk according to the first invention,
wherein the disk is a disk for recording, and
write-inhibit means for preventing accidental erasure of recorded data on the disk at the time of recording action into the disk is provided at least in the lid. The 16th invention is a disk cartridge capable of taking out a disk according to the 15th invention,
wherein the write-inhibit means possesses a movable protrusion formed integrally on the lid, and a write-inhibit hole corresponding to a movable range of the protrusion formed on the case main body, and
the protrusion is held at predetermined position showing record forbid or record enable state, depending on the convex or concave part provided at the inner side of the write-inhibit hole.

The 17th invention is a disk cartridge capable of taking out a disk according to the first invention,
wherein the case main body is composed of plate members of upper half and lower half, and
a gripping member for engaging with the upper and lower halves when the lid closes the disk access of the case main body to prevent lifting of the upper and lower halves is formed in the lid.

The 18th invention is a disk cartridge capable of taking out a disk according to the 17th invention,
wherein the gripping member can be deformed elastically, and has a stopping pawl at its free end, and the upper and lower halves have a concave part to be engaged with the stopping pawl, and
the gripping member, when inserted into the upper and lower halves and fitted and fixed, is engaged with the concave part of the upper and lower halves after the stopping pawl abuts and moves on the upper and lower halves.

Figure 1:
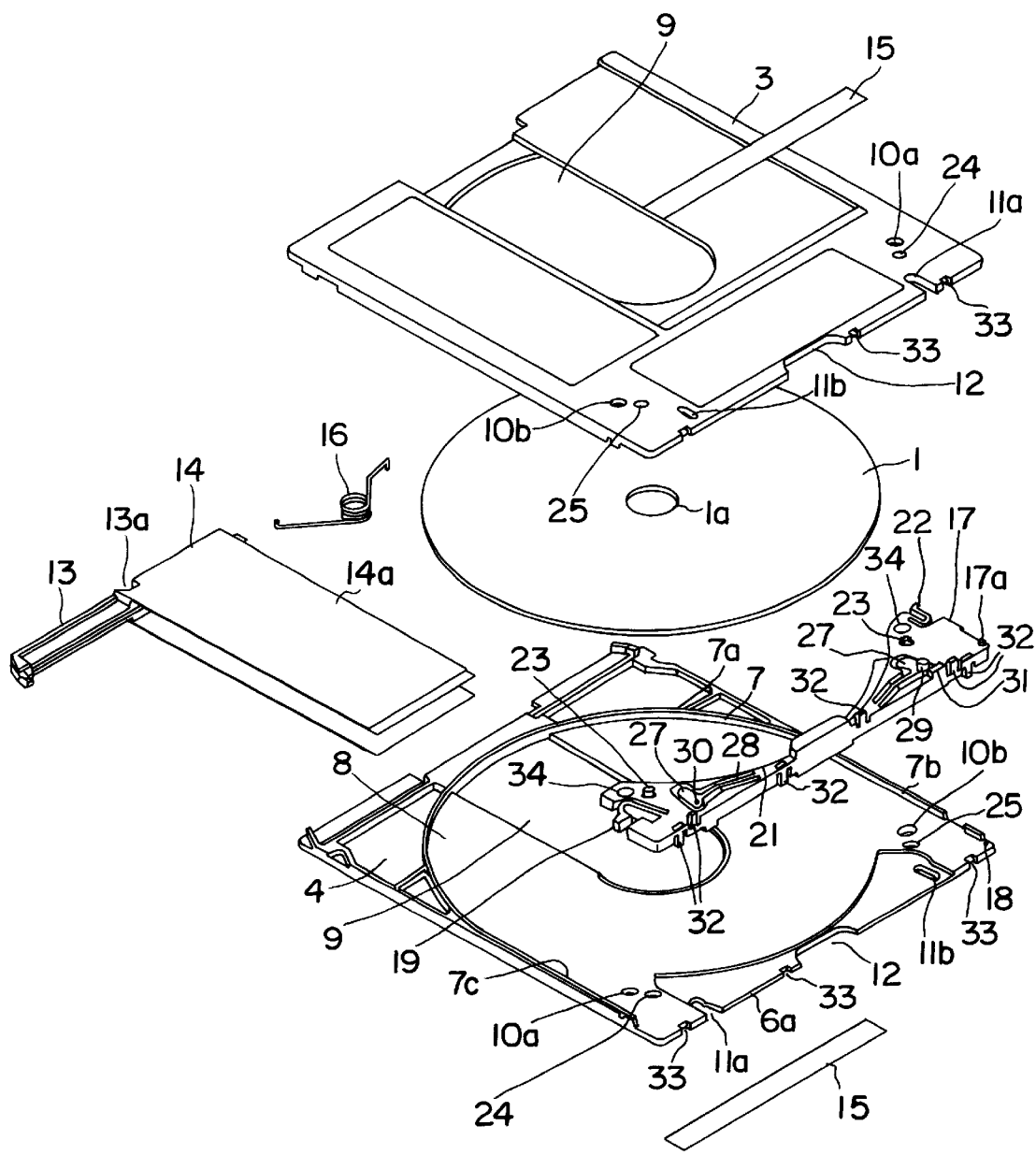
FIG. 1 is a perspective exploded view of a cartridge capable of taking out a disk in an embodiment of the invention.

DESCRIPTION OF THE REFERENCE NUMERALS 1 disk
2 case main body
3 upper half
4 lower half
5 disk access
7 inner wall
8 disk accommodating unit
9 opening
10a,10b positioning holes
12 notch
13 slider
14 shutter
15 shutter holder
16 torsion spring
17 lid for opening and closing
18 rotary concave part
19 pawl
20 pawl hole
21 arc portion
22 resin spring
23 stopping bar
24 stopping hole
25 discharge hole
26 handle
27 movable piece
28 linkage branch
29 detection protrusion
30 moving hole
31 protrusion
32 stopping pawl
33 concave part
34 penetration hole
35 defining unit
36 disk guide groove

DESCRIPTION OF THE PREFERRED EMBODIMENTS

An embodiment of a cartridge capable of taking out a disk according to the invention is described below.

The structure of the cartridge capable of taking out a disk of the embodiment is described by reference to FIG. 1 FIG. 5.

Figure 2:
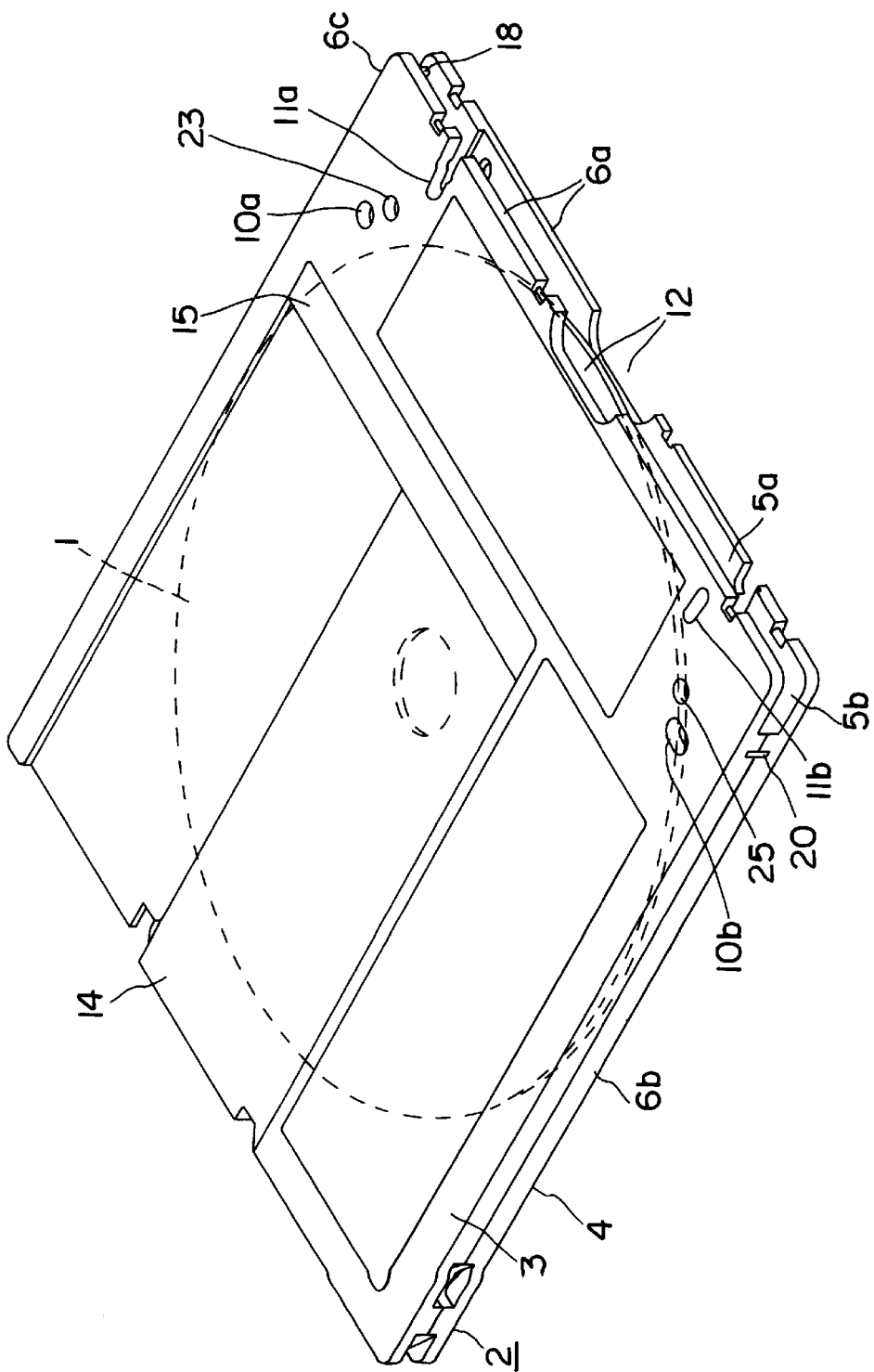
FIG. 2 is an appearance view of detached state of lid of the cartridge in the embodiment.
Figure 3:
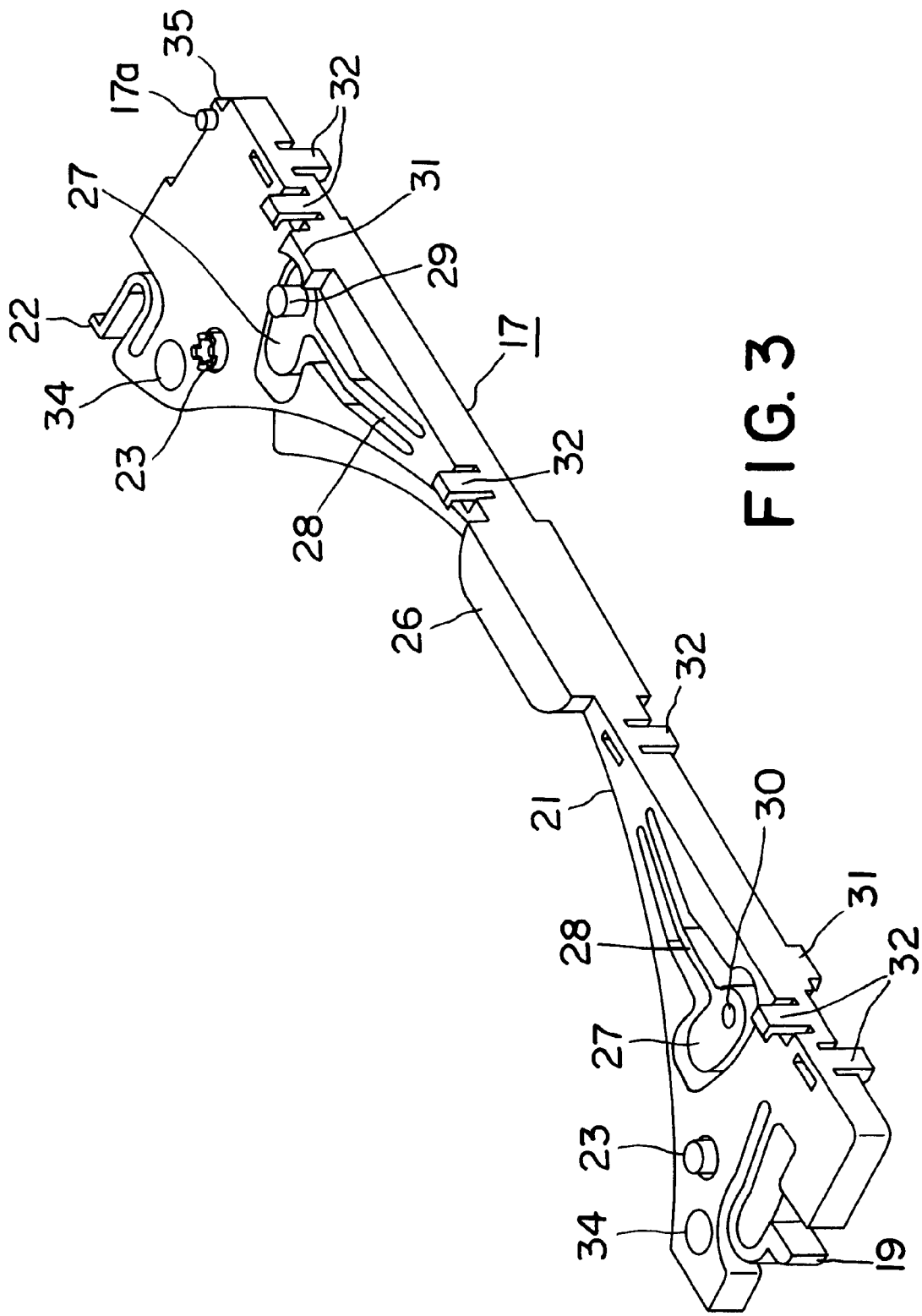
FIG. 3 is an appearance view of the lid of the cartridge in the embodiment.
Figure 4:
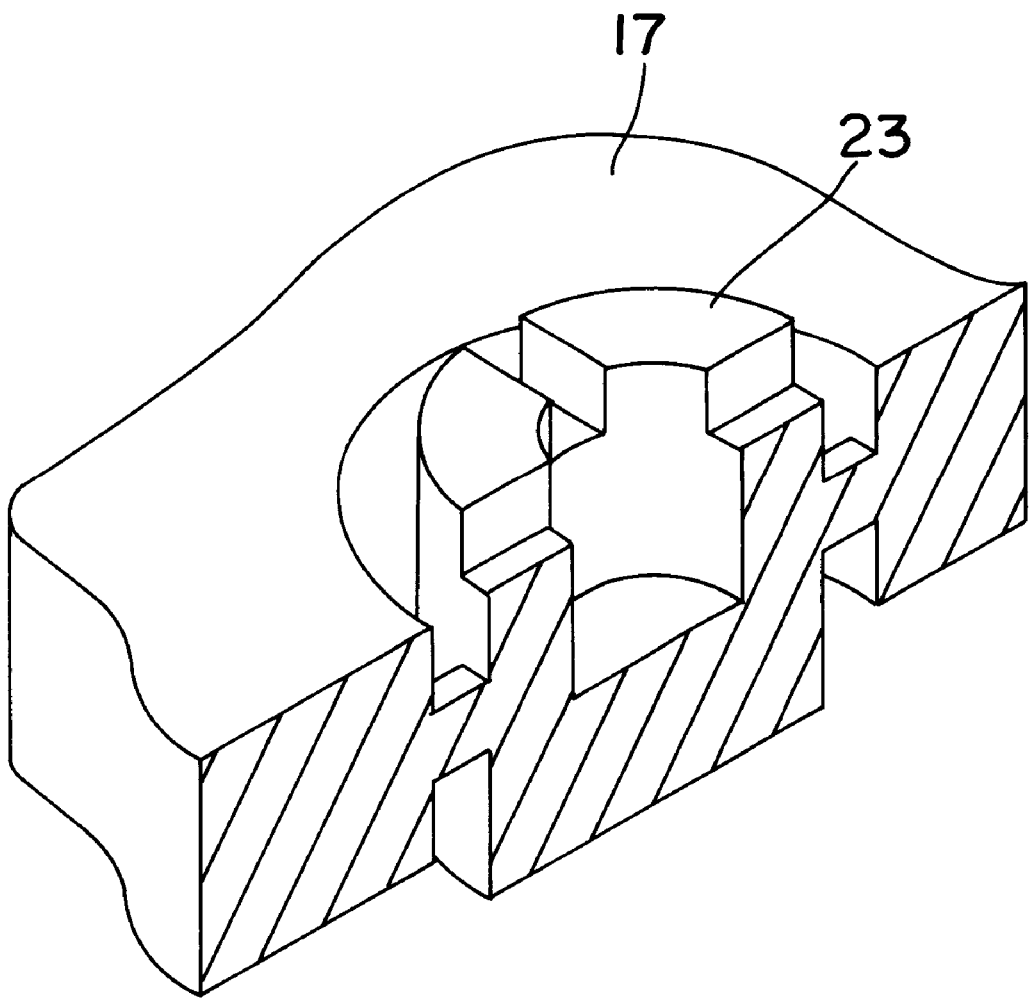
FIG. 4 is a sectional magnified perspective view of a stopping bar of the cartridge in the embodiment.
Figure 5:
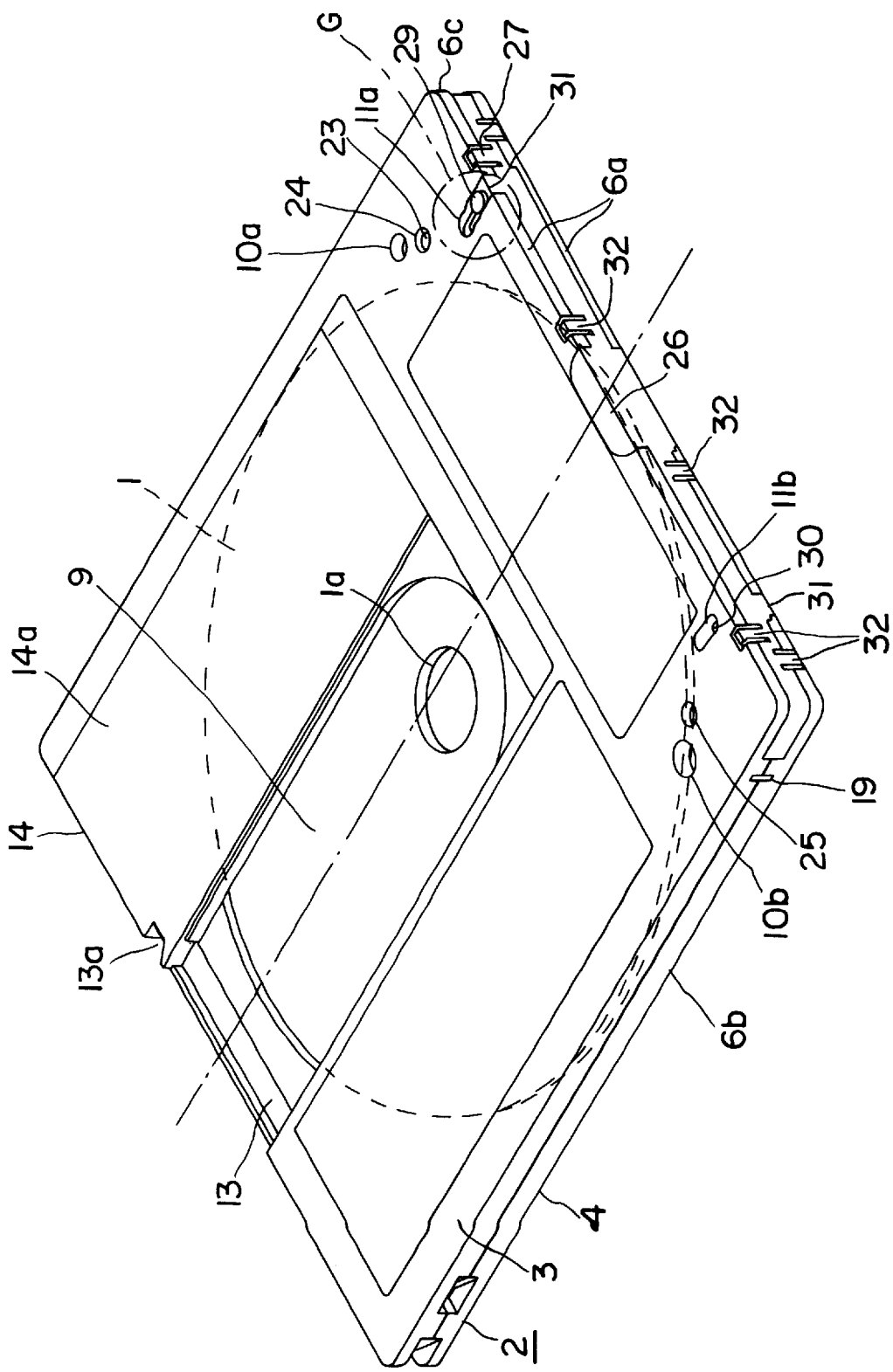
FIG. 5 is a perspective appearance view of the cartridge in the embodiment.

FIG. 1 is a perspective exploded view of a cartridge capable of taking out a disk of the embodiment, FIG. 2 is an appearance view of detached state of lid of the cartridge, FIG. 3 is an appearance view of the lid of the cartridge, FIG. 4 is a sectional magnified perspective view of a stopping bar of the cartridge, and FIG. 5 is a perspective appearance view of the cartridge.

In FIG. 1 to FIG. 3, reference numeral 1 is a disk of 120 mm in diameter having a central hole 1a, and reference numeral 2 is a case main body of 124 mm in width for accommodating the disk 1, being composed of identical upper half 3 and lower half 4 coupled together. Herein, the disk 1 is an optical disk for recording. The upper half 3 and lower half 4 are formed of polycarbonate, ABS, or other resin, and are coupled by fusion. Reference numeral 5 is a disk access allowing to pass through the disk 1 formed along two side walls 6a, 6b of the case main body 2. The disk access 5 composed of an opening 5a extending over the side wall 6a, and an opening 5b formed in part of the side wall 6b. Herein, the side wall 6a and side wall 6b correspond respectively to one end face of substantially four end faces of the case main body 2 of the invention, and other end face adjacent to this end face. Reference numeral 7 is a U-shaped inner wall formed inside of the upper half 3 and lower half 5. An arc portion 7a of the inner wall 7 is an accommodation wall of a disk accommodating unit 8 for accommodating the disk 1 in the case main body 2, together with an arc portion 21 of a lid described later. Straight portions 7b, 7c of the inner wall 7 communicate with the disk access 5, and serve as guides for leading the disk into the disk access 5. On the top of the upper half 3 and lower half 4, there are formed an opening 9 for inserting a pickup and a disk motor, positioning holes 10a, 10b to be engaged with pins of the disk device for placing the cartridge in a specified position, and oblong write-inhibit holes 11a, 11b for preventing accidental erasure of recorded data. Incidentally, the write-inhibit hole 11a is opened to the side wall 6a, and the write-inhibit hole 11a of the upper half 3 confronts the write-inhibit hole 11b of the lower half 4. Near the middle of the side wall 6a side of the upper half 3 and lower half 4, a semicircular notch 12 is provided. The concave part of the invention corresponds to the notch 12. Reference numeral 13 is a slider slidably held inside of the case main body 2, and a shutter 14 with a U section having a shielding part 14a for opening and closing the opening 9 is coupled. The leading end of the shielding part 14a of the shutter 14 is guided and held in a shutter holder 15 fixed in the upper half 3 and lower half 4 (see FIG. 2). The slider 13 has an opener concave part 13a to be engaged with a shutter opening 41 (see FIG. 14) of the disk device side described later. Reference numeral 16 is a torsion spring disposed in the case main body 2, with one end fixed in the corner of the case main body 2 and other end in the slider 13, and it thrusts the shutter 14 in a direction for closing the opening 9.

Reference numeral 17 is a lid for opening and closing the disk access 5, and is rotatably supported with a pivot 17a inserted in a rotary concave part 18 provided in the corner of the case main body 2. The lid 17 is a resin formed piece of polyacetal, and is composed by integrally forming functional parts mentioned below, and differs in color from the case main body 2. Reference numeral 19 is an elastic deforming pawl (clasp) provided at the end portion on the lid 17 at the nearly opposite side to the position of the pivot 17a. As shown in FIG. 2, this pawl 19 is intended to fit and fix the lid 17 to the case main body 2 by fitting into a pawl hole (clasp hole) 20 provided in the side wall 6b when the disk access 5 is closed by the lid 17. In this state, the arc portion 21 of the lid 17 composes the accommodating wall of the disk accommodating part 8 together with the arc portion 7a of the inner wall 7 mentioned above. Reference numeral 22 is a resin spring provided near the pivot 17a of the lid 17. This resin spring 22 abuts against the straight portion 7b of the inner wall 7 and is deformed when the lid 17 is fixed in the case main body 2, and acts as thrusting means for generating a thrusting force in a direction for opening the lid 17. This resin spring 22 can abut against the outer circumferential end portion of the disk 1 when the lid 17 is opened, and acts also as an elastic deforming abutting member (or abutting portion). Reference numeral 23 is a stopping bar disposed at a position symmetrical to central axis A—A (see FIG. 5) passing through the opening 9, and in the assembled state of the cartridge, it is means for fixing the lid 17 to the case main body 2, by engagement with a stopping hole 24 provided individually in the upper half 3 and lower half 4. As shown in FIG. 4, meanwhile, the stopping bar 23 is formed of resin integrally with the lid 17, and is coupled with the lid 17 through a thin wall portion, and the side to be engaged with the stopping hole 24 has a groove to be engaged with the leading end of the screw driver, while the other side is inserted into a discharge hole 25 provided individually in the upper half 3 and lower half 4, and the discharge hole is clogged while fitting with the discharge hole. By inserting the leading end of a screwdriver into the groove of the stopping bar 23 and rotating, the thin wall portion is divided, and the stopping bar 23 can be detached from the discharge hole 25. As shown in FIG. 3, reference numeral 26 is a semicircular handle provided in the middle of the lid 17, and is engaged with the notch 12 of the upper half 3 and lower half 4. Reference numeral 27 is a movable piece formed integrally with the lid 17, having write-inhibit holes 11a, 11b, and is coupled with the lid 17 movable through an elastic linkage branch 28. The movable piece 27 comprises a cylindrical detection protrusion (or detecting lid) 29 positioned at a predetermined position showing record disable or record enable by the convex and concave portions provided in the inner side of the write-inhibit hole 11a by fitting into the write-inhibit hole 11a, and a moving hole 30 for allowing to move the detection protrusion 29 from the write-inhibit hole 11b (see FIGS. 6 to 10). The protrusion of the invention corresponds to the detection protrusion 29. Reference numeral 31 is a protrusion to be engaged with the releasing portion of the write-inhibit hole 11a (see FIG. 5), and 32 is a stopping pawl (or stopping clasp) to be engaged with a concave part 33 provided in the side wall 5a of the upper half 3 and lower half 4 (see FIGS. 1 and 3), and is deformed elastically for preventing the upper half 3 and lower half 4 from loosening. Reference numeral 34 is a penetration hole opened in the lid 17. This penetration hole 34 is provided at a position corresponding to positioning holes 10a, 10b provided in the upper half 3 and lower half 4, respectively.

Herein, the constitution of the parts around the detection protrusion 29 is specifically described below while referring to the drawings.

Figure 6:
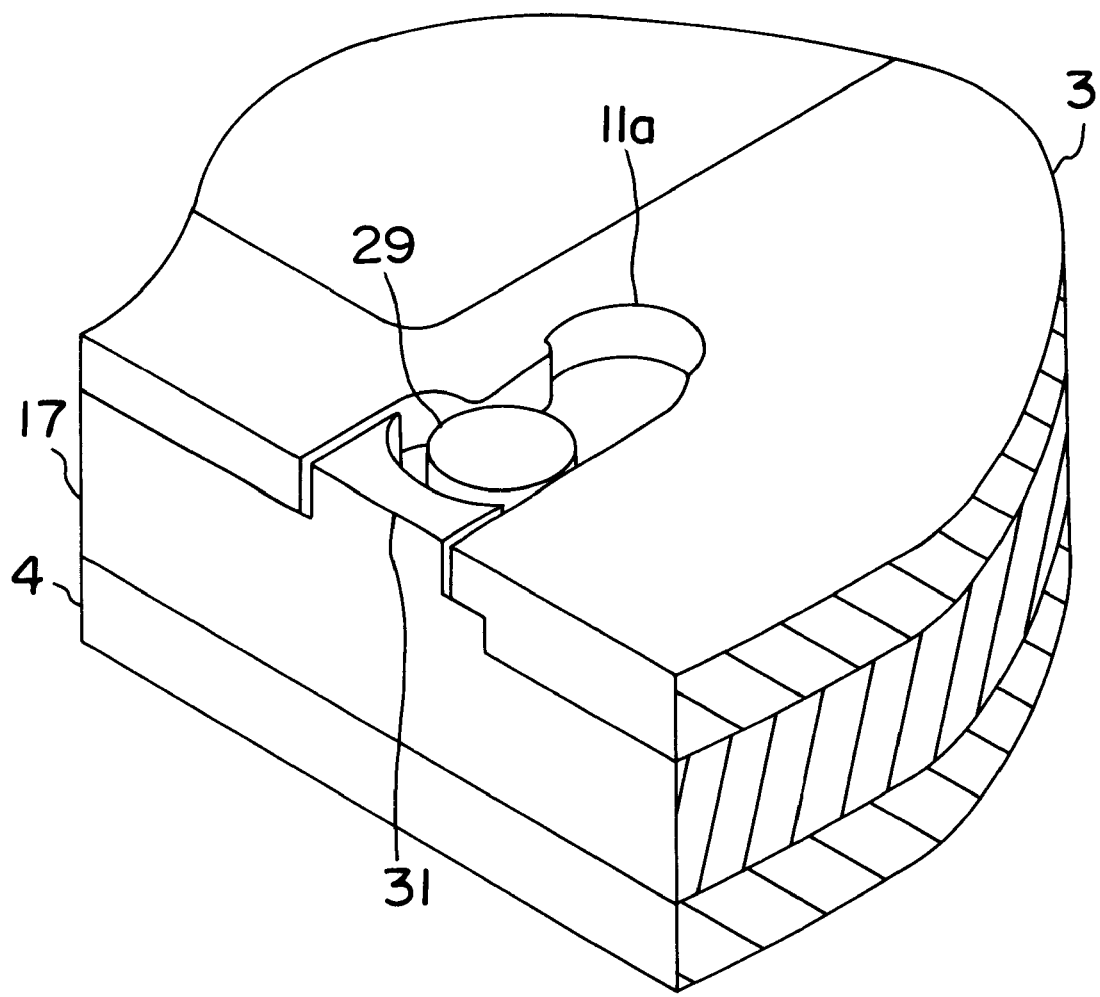
FIG. 6 is a partial magnified perspective view of area indicated by G in FIG. 5.
Figure 7:
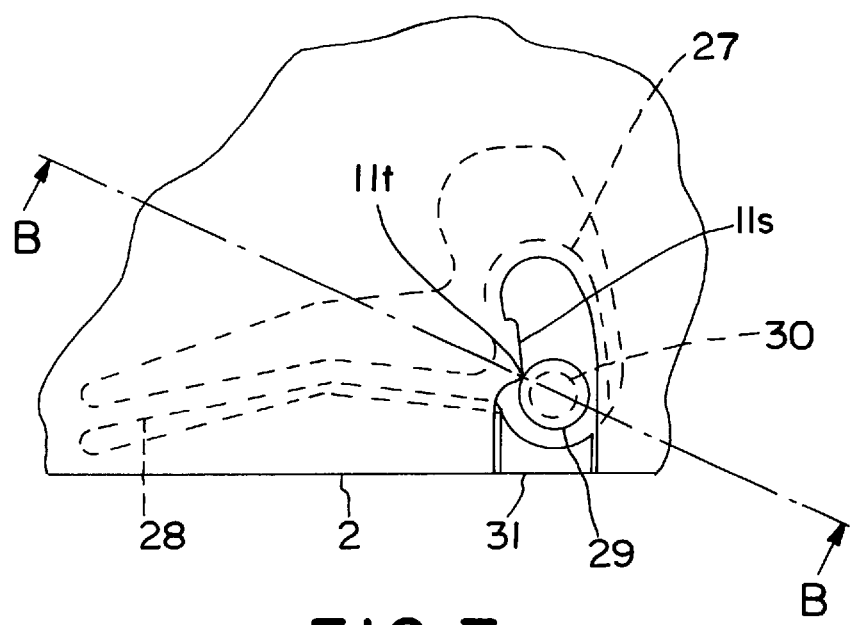
FIG. 7 is a plan view of the same place as shown in FIG. 6.

FIG. 6 is a partially magnified perspective view of the portion indicated by G in FIG. 5, showing the state of the detection protrusion 29 positioned at a recordable position. FIG. 7 is a plan view of the same place as shown in FIG. 6.

As shown in FIG. 7, as the side portion of the detection protrusion 29 is caught in the lower end portion 11t of the convex part 11s provided at the inner side of the write-inhibit hole 11a, the detection protrusion 29 is held at the shown position as far as external force is not applied.

Figure 8:
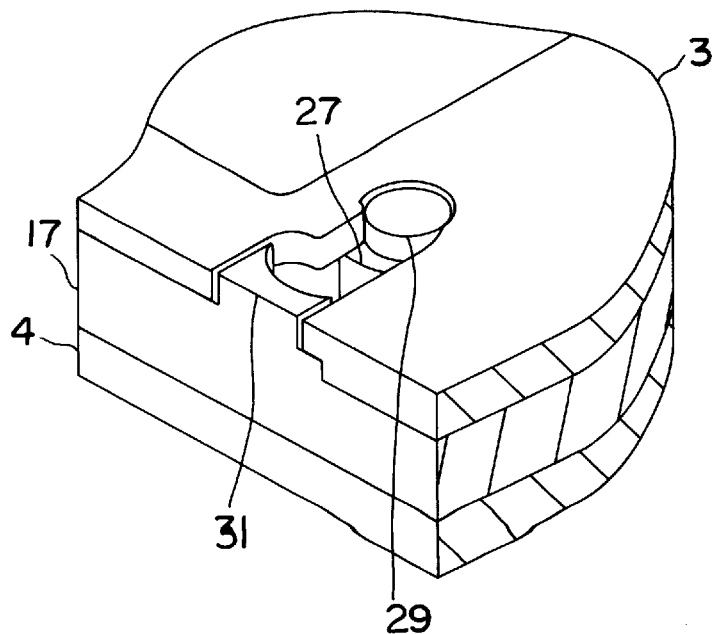
FIG. 8 is a partial magnified perspective view of area indicated by G in FIG. 5.
Figure 9:
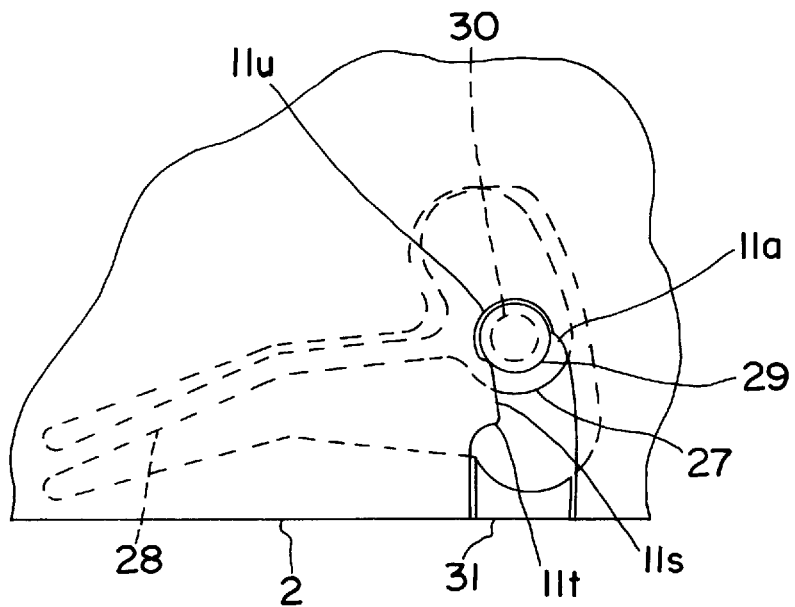
FIG. 9 is a plan view of the same place as shown in FIG. 8.

FIG. 8 is a partially magnified perspective view in the area indicated by G in FIG. 5, showing the positioned state of the detection protrusion 29 at the record disable (record forbid) position. FIG. 9 is a plan view of the same place as shown in FIG. 8.

As shown in FIG. 9, as the side portion of the detection protrusion 29 is engaged with a concave part 11u provided at the inner side of the write-inhibit hole 11a, the detection protrusion 29 is held at the shown position as far as external force is not applied.

Figure 10:
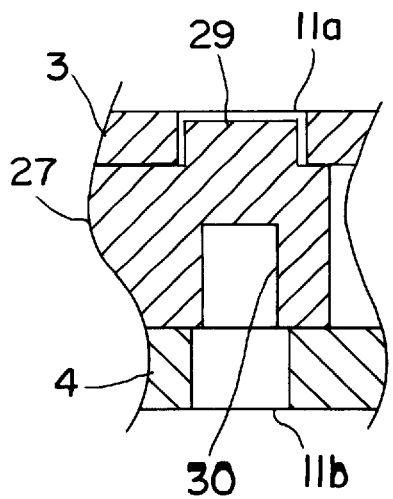
FIG. 10 is a sectional view of line B—B in FIG. 7, for explaining the structure of a moving hole 30.

FIG. 10 is a sectional view of B—B line in FIG. 7, explaining the structure of the moving hole 30. As shown in the drawing, a piece like a pin having a thin end is inserted from the write-inhibit hole 11b into the moving hole 30, and the detection protrusion 29 is moved to record enable position or record disable position.

The constitution of the embodiment is described while referring to the drawing in the open state of the lid 17, with the stopping bar 23 folded and removed by screwdriver or the like as mentioned above.

Figure 11:
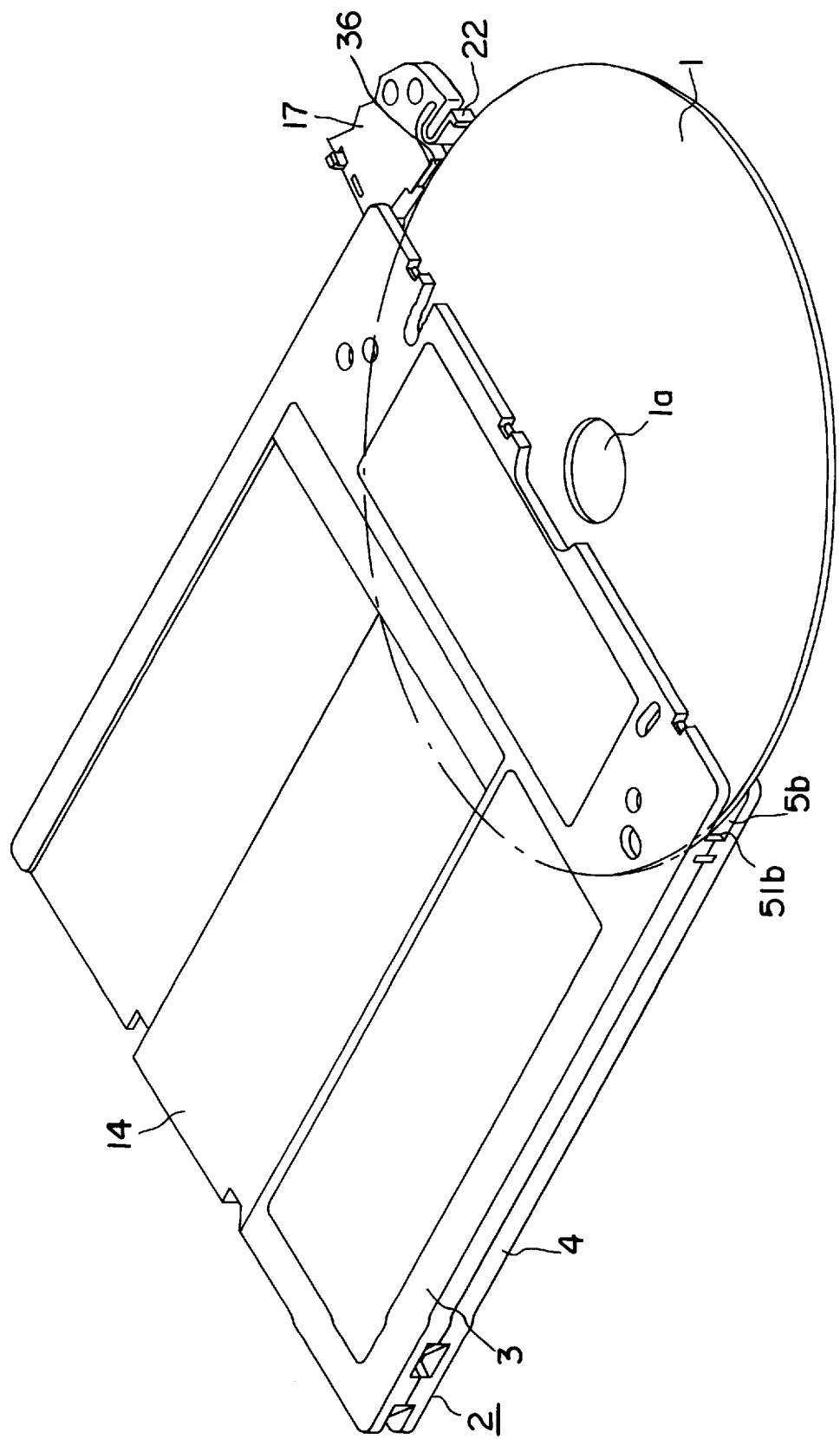
FIG. 11 is a perspective appearance view of the cartridge in open slid state of the cartridge in the embodiment.
Figure 12:
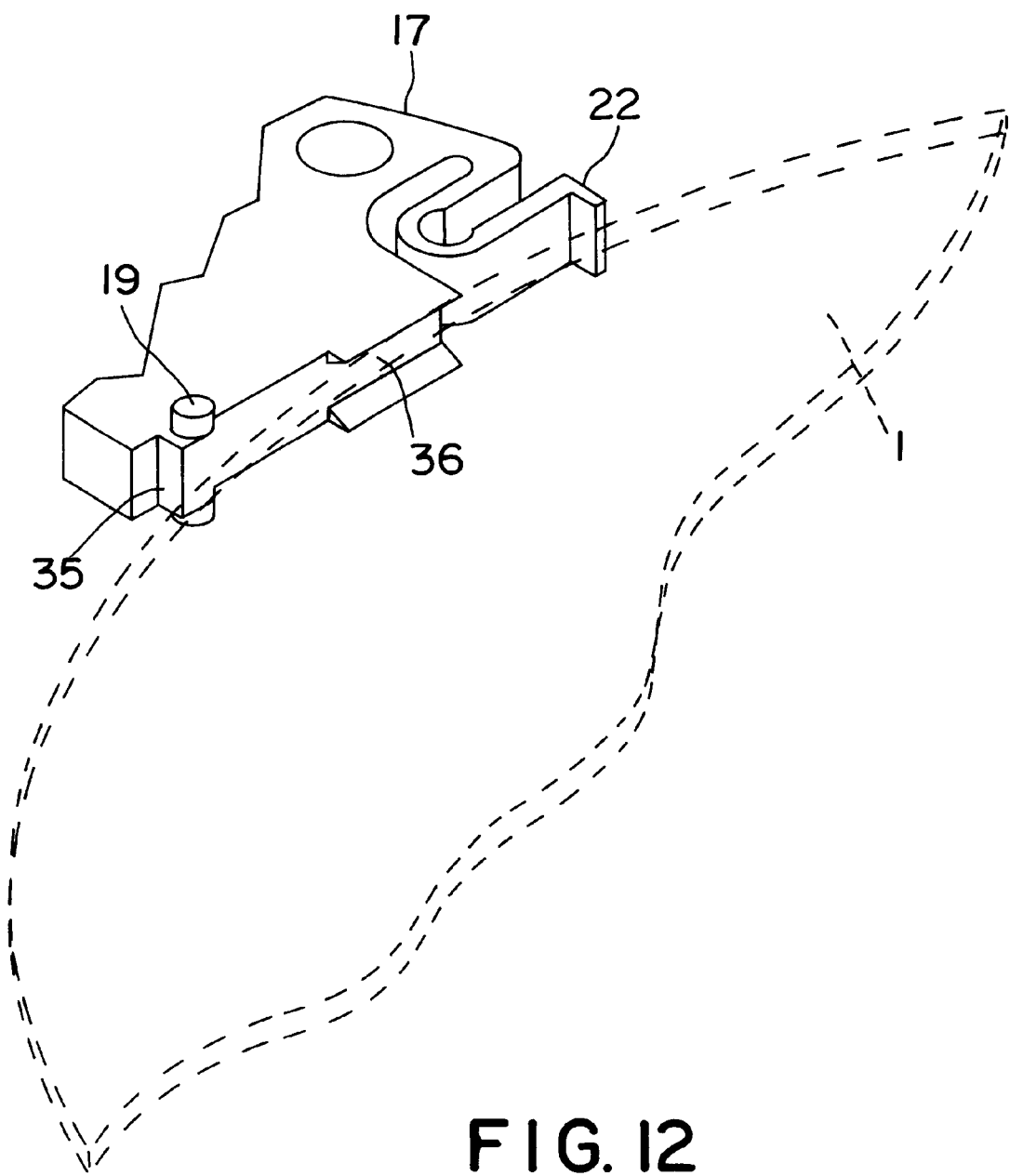
FIG. 12 is a partial perspective magnified view of the lid of the cartridge in the embodiment.
Figure 13:
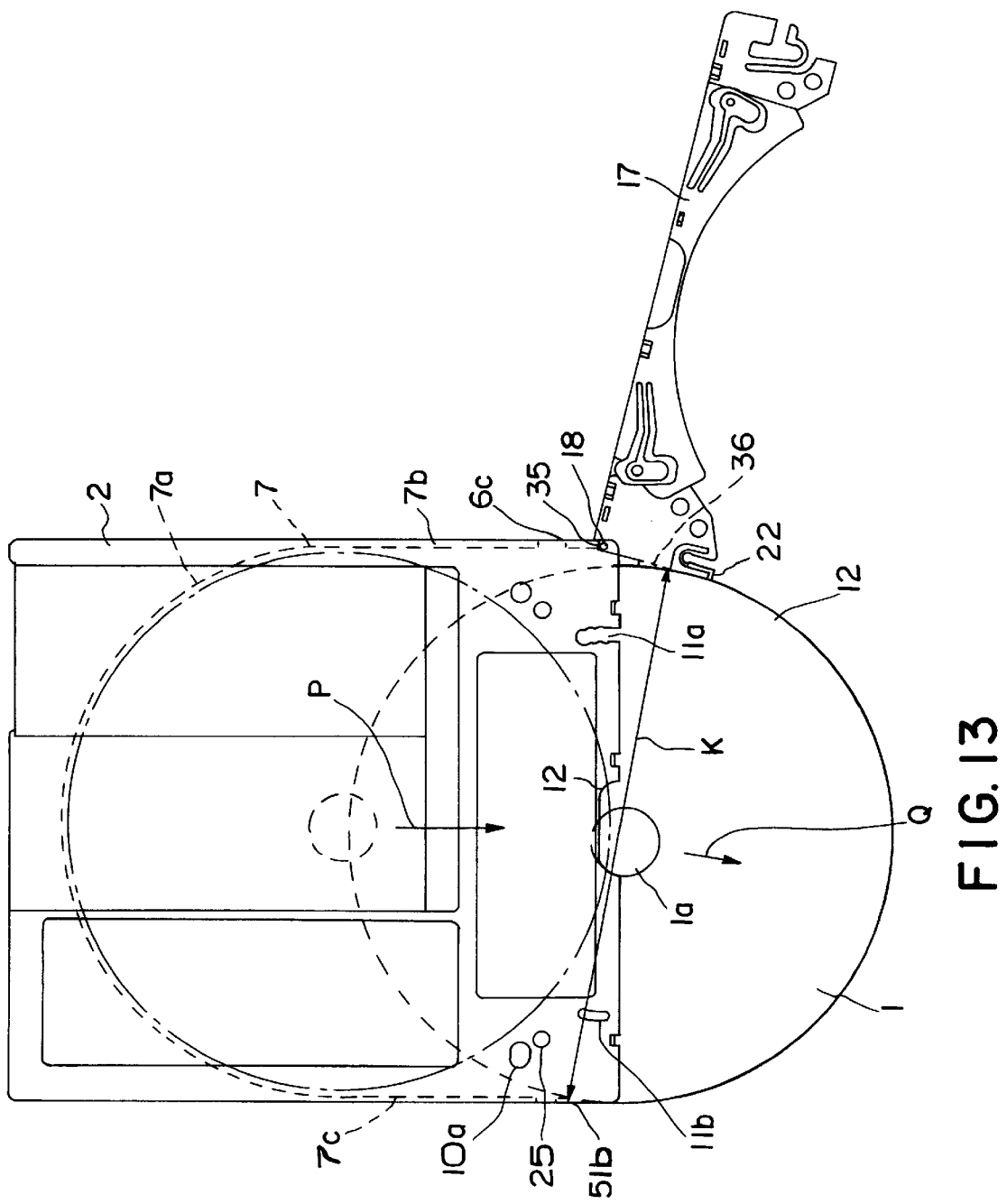
FIG. 13 is a plan view of the cartridge in open lid state of the cartridge in the embodiment.

FIG. 11 is a perspective appearance drawing of the cartridge in open state of the lid, FIG. 12 is a partially magnified view of the lid, and FIG. 13 is a plan view of the cartridge in the open lid state.

As shown in FIG. 12 and FIG. 13, reference numeral 35 is a defining unit formed in the lid 17. This defining unit 35 is for defining the rotation of the lid 17 by abutting against one end of the side wall 6c of the case main body 2. As shown in the drawings, moreover, reference numeral 36 is a disk guide groove for holding and guiding the disk 1 discharged from the disk access 5. As shown in FIG. 11, with the lid 17 opened to the maximum extent, distance K (see FIG. 13) from an inner circumferential end 51b of the opening 5b of the disk access 5 to the bottom of the disk guide groove 36 is set slightly larger than the diameter of the disk 1. The place set in this distance K is the narrowest position, except for the position of distance L mentioned later, in the route of passing of the disk 1, when the disk 1 is discharged. The distance L from the inner circumferential end 51b of the opening 5b of the disk access 5 to the leading end of the resin spring 22 of the lid 17 is set slightly smaller than the diameter of the disk 1 in the state of the resin spring 22 not deformed elastically. The resin spring 22 has a function of an elastic deforming abutting member. When the disk 1 discharged from the case main body 2 from the disk access 5 abuts simultaneously against the inner circumferential end 51b of the opening 5 and the leading end of the resin spring 22, only the resin spring 22 is deformed elastically, and by its restoring force, accordingly, the disk 1 is temporarily held between the inner circumferential end 51b and the leading end of the resin spring 22. The move suppressing/stopping means of the invention is the means comprising the inner circumferential end 51b and the leading end of the resin spring 22. The abutting portion provided at a specific position of the lid of the invention corresponds to the resin spring 22, and the abutting portion provided near the disk access of the invention corresponds to the inner circumferential end 51b. As shown in FIG. 13 and others, when the disk 1 is held by the inner circumferential end 51b and resin spring 22, it is composed so that the central hole 1a of the disk 1 may be opposite to the notch 12.

Figure 14:
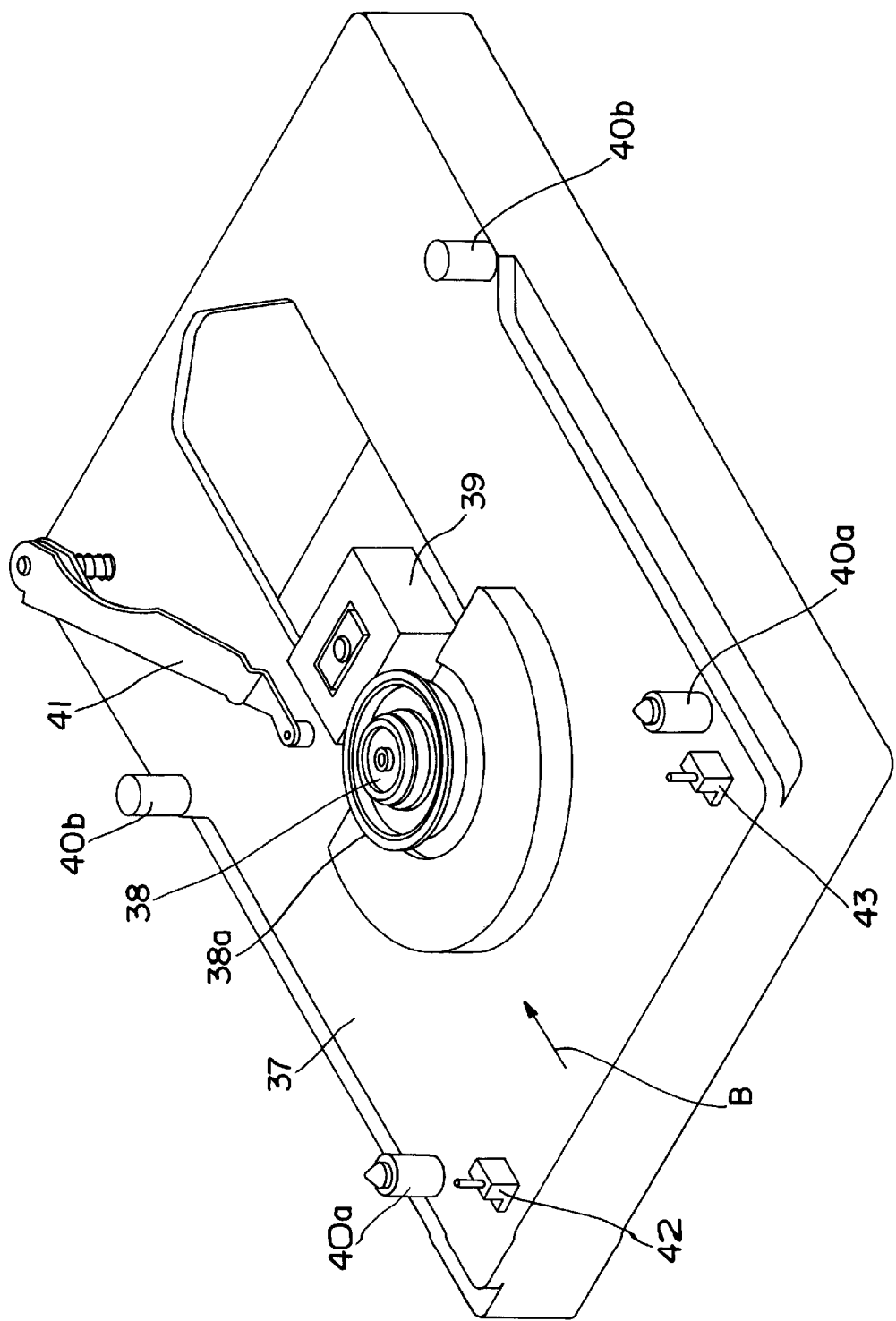
FIG. 14 is a perspective appearance view of a recording and reproducing device (disk device) suited to the cartridge in the embodiment.

A recording and reproducing device for recording and reproducing the disk contained in thus constituted cartridge is described by referring to FIG. 14. For the ease of understanding, the constitution not relating to the invention is omitted.

In the drawing, on a base stand 37, there are formed a disk motor 38 having a turntable 38a for mounting the disk 1 on, a pickup 39 for recording and reproducing, positioning pins 40a, 40b for defining the position of the cartridge, a rotatable shutter opener 41 being thrust by a spring for opening and closing the shutter 14, a write-inhibit switch 42 to be inserted into the write-inhibit hole 11a, and a cartridge detection switch 43 to be inserted into the discharge hole 25 for detecting whether the disk is taken out of the cartridge or not.

The write-inhibit switch 42 detects the record forbid state when the leading end of the detection switch 42 can be inserted into the write-inhibit hole 11a of the disk cartridge in the embodiment being loaded in the recording and reproducing device, and when the leading end of the detection switch 42 abuts against the detection protrusion 27, thereby making it impossible to insert into the write-inhibit hole 11a, it is detected that the record is enabled. On the other hand, the cartridge detection switch 43, when the leading end of the detection switch 43 abuts against the stopping bar 23, detects that the cartridge has no past history of the contained disk 1 ever taken out of the cartridge. If the stopping bar 23 is already removed and the leading end of the detection switch 43 is inserted into the discharge hole 25 and there is nothing to abut against, it is detected that the cartridge has the history of its disk 1 once taken out of the cartridge.

The operation of the cartridge capable of taking out the disk in the embodiment in this constitution is described below while referring to FIG. 5 and FIG. 14 and others.

First is explained a case of loading a cartridge not having the past history of the contained disk 1 ever taken out of the cartridge, into the recording and reproducing device.

When the cartridge of the embodiment is loaded into the cartridge holder (not shown) and inserted in the direction of arrow B (see FIG. 14), the shutter opener 41 is engaged with the opener concave part 13a of the slider 13 (see FIG. 5 and the slider 13 is moved by resisting the thrusting force of the torsion spring 16 (see FIG. 1), so that the shutter 14 moves in a direction of exposing the opening 9. When the opening 9 is completely exposed, the cartridge descends to the base stand 37 side by loading mechanism not shown, and two positioning pins 40a (see FIG. 14) provided on the base stand 37 are fitted into positioning holes 10a, 10b (see FIG. 5) at the case main body 2 side, and two positioning pins 40b provided in the base stand 37 abut against the top of the case main body 2, thereby completing loading of the cartridge. At this time, the disk motor 38 and pickup 39 are inserted into the opening 9, and the disk 1 is mounted on the turntable 38a. The cartridge detection switch 43 abuts against the stopping bar 23, and the write-inhibit switch 42 abuts against the detection protrusion 29.

The recording and reproducing device shown in FIG. 14 recognizes as the cartridge not having past history of the disk ever being taken out, by the detection signal from the cartridge detection switch 43, and recognizes that the disk 1 is in recordable state, by the detection signal from the write-inhibit switch 42. Afterwards, by rotating the disk motor 38 and moving the pickup 39 to the specified place by pickup transfer means not shown, information is recorded in the disk 1 or information is read out from the disk 1.

To set the disk 1 in record forbid state, as shown in FIG. 10, a pin with a thin end or the like is inserted into the moving hole 30 of the moving piece 27 from the write-inhibit hole 11b of the case main body 2, and the moving piece 27 is moved from the position shown in FIG. 7 to the position shown in FIG. 9, so that the leading end of the write-inhibit switch 42 may be inserted into the write-inhibit hole 11a. When moving the moving piece 27 in this way, a moderate click feel is desired before and after the moving piece 27 rides over the convex part 11s for the sake of controllability. The detection protrusion 29 is easily visible from the write-inhibit hole 11a of the case main body 2, and the entire color of the moving piece 27 is different from the color of the case main body 2, so that it is easily judged visually from outside the case main body 2, whether the moving piece 27 is at the recordable position or at record forbid position.

Described next is the operation of taking out the disk from the cartridge having the contained disk 1 never before taken out of the cartridge.

The leading end of a screwdriver is inserted from the stopping hole 24 formed in each side of the case main body 2, the groove of the stopping bar 23 (see FIG. 4) is inserted and rotated, two stopping bars 23 provided in the lid 17 are folded and removed, and are discharged from the discharge hole 25 provided in each side of the case main body 2.

As a result, fixing of the lid 17 and case main body 2 is cleared. Sine the stopping bar 23 and case main body 2 are different in color, the presence or absence of the stopping bar can be easily recognized visually. Afterwards, by pushing the pawl 19 engaged with a pawl hole 20 of the side wall 6b of the case main body 2 by the tip of a thin pin or the like, the engagement of the pawl 19 and pawl hole 20 is cleared, and the lid 17 is slightly rotated in the opening direction by the thrusting force of the resin spring 22. At this time, the engagement of the concave part 33 of the upper half 3 and lower half 4, and the stopping pawl 32 of the lid 17, and the engagement of the write-inhibit hole 11a and the protrusion 31 of the lid 17 are also cleared.

By holding the handle 26 of the lid 17 by hand, when turned in the direction of opening the lid 17, the detection protrusion 29 of the moving piece 27 slides in the write-inhibit hole 11a, and moves from the releasing position to the outside of the case main body 2. By further rotating, the lid 17 is opened to the maximum rotation position as shown in FIG. 13. In this state, when the case main body 2 is inclined, the disk 1 contained in the disk accommodating part 8 is guided along the straight lines 7b, 7c of the inner wall 7 by the action of gravity, and begins to move straightly toward the disk access 5 as indicated by arrow P in FIG. 13, and is discharged outside of the case main body 2 through the disk access 5. At this time of discharge operation, one side of the outer circumferential end of the disk 1 abuts against the bottom of the disk guide groove 36 of the lid 17 (or the inner circumferential end 51b of the opening 5b), and the moving speed is lowered. Consequently, one side of the outer circumferential end of the disk 1 moves along the disk guide groove 36 of the lid 17. That is, as shown by arrow Q in FIG. 13, the disk 1 moves while changing the moving direction from direction P to direction Q. Shortly after, the inner circumferential end 51b of the opening 5 and the leading end of the resin spring 22 abut against the disk 1 simultaneously from both sides of the outer circumferential end of the disk 1. As a result, the resin spring 22 is deformed elastically, and the disk 1 is temporarily pinched and held between the inner circumferential end 51b and the leading end of the resin spring 22 by the restoring force of elastic deformation. FIG. 13 shows the temporarily held state of the disk by the restoring force. At this time, sine the central hole 1a of the disk 1 is exposed from the notch 12 of the case main body 2, it can be easily taken out of the cartridge by pinching the central hole 1a and outer circumference of the disk 1 by fingers.

In this way, by extending the disk access 5 between one side wall 6a of four side walls confronting in the thickness direction of the case main body 2, and another side wall 6b adjacent to this side wall 6a, the width of the case main body 2 may be set at 124 mm, and therefore it realizes the disk cartridge capable of taking out the disk by using the rotary lid, in spite of the outer dimension closer to 120 mm which is the diameter of the disk. Moreover, since the disk is held temporarily in the butting portion, the disk can be taken out by putting fingertip into the central hole 1a of the disk 1, in this held state, so that the information side of the disk is not touched, and the data reliability is enhanced.

To put the disk 1 into the case main body 2, the operation is reverse to the procedure of taking out. Holding the central hole 1a and outer circumference of the disk 1 by finger, it is inserted into the disk access, and is held by the resin spring 22. Then, pushing the outer circumference of the disk 1 by finger, engagement with the resin spring is cleared, and the disk 1 is slipped into the disk accommodating part 8. By turning and closing the lid 17, the clasp 19 of the lid is fitted into the clasp hole 20 of the case main body 2, and is fixed in the case main body 2. At this time, the stopping clasp 32 of the lid 17 is fitted into the concave part 33 of the upper case 3 and lower case 4 to hold the upper case 3 and lower case 5, so that lifting of the case main body 2 near the disk access 5 is prevented.

The cartridge from which the disk is once removed can be distinguished because there is no stopping bar 23. When this cartridge is put into the disk device, the cartridge detection switch 43 is inserted into the discharge hole 25, and it is judged to be the cartridge from which the disk is once taken out. According to the judgement, the disk device gets into, for example, the mode for inspecting the information side, and judge whether recordable or not, thereby enhancing the reliability of recording. The cartridge of the embodiment is composed to deal with two-sided disk, and the shape is the same when the cartridge is turned upside down and loaded, so that the same operation is guaranteed.

The assembling method of the disk cartridge capable of taking out the disk of the embodiment is described below while referring to the drawings.

As shown in FIG. 1, with the top (that is, the outer side) of the lower half 4 down, the lid 17 is dropped on the lower half 4 from above the inner side of the lower half 4. At this time, the pivot 17a is inserted into the rotary concave part 18, and the stopping bar 23 is inserted into the stopping hole 24, and the resin spring 22 is deformed and inserted into the straight portion 7b of the inner wall 7 of the lower half 4 by abutting. At this time, the stopping pawl 32 of the lid 17 abuts against the inner surface of the lower case 4, but when the lid 17 is further pushed down to the lower half 4 side, the stopping pawl 32 is elastically deformed toward the outer side of the lower case (right oblique downward direction in FIG. 1 and FIG. 3) by the slope provided at the abutting side of the stopping pawl 32, and rides over the lower case 5, and is fitted into the concave part 33 (see FIG. 1, FIG. 3 and FIG. 5). As a result, mounting of the lid 17 on the lower half 4 is complete.

Next, putting the disk 1 into the disk accommodating part 8, the slider 13 is placed at specified position. Then, dropping the upper half onto the lower half 4 from above the inner side of the lower half 5, the pivot 17a is inserted into the rotary concave part 18, and the stopping bar 23 is inserted into the stopping hole 24. Same as in the case of lower half 4, then, the upper half 3 is further pushed down so that the stopping pawl 32 of the lid 17 may be deformed elastically to ride over the upper half 3, and the stopping pawl 32 is fitted into the concave part 33. This ends mounting of the upper half 3.

The case main body 2 is completed by fusing necessary positions of the upper half 3 and lower half 4 by ultrasonic wave.

Finally, the torsion spring 16 is inserted and fixed into the case main body 2 from the opening, and the shutter 14 is fixed on the slider 13, thereby finishing the assembly.

In this manner, the constituent parts of the cartridge are assembled sequentially by stacking from bottom to top, so that the assembling efficiency is excellent.

Accordingly, to achieve the objects, the disk cartridge capable of taking out the disk of the invention comprises a disk accommodating part for accommodating a disk rotatably therein, being in a nearly rectangular form, a case main body having at least one opening for inserting a disk motor and a pickup into the disk accommodating part, a shutter having a shielding plate for opening and closing the opening of the case main body, a disk access communicating with the disk accommodating part, allowing the disk to pass through the side wall of the case main body, a lid for opening and closing the disk access, as being rotatably supported on the case main body, and an abutting member for abutting against the disk outer circumferential end when releasing the lid, wherein a disk guide passage is formed so that the disk may be discharged from the disk access, in the released state of the lid, after the disk moves in a specified range along the inner surface of the side wall of the case main body, and abuts against the abutting member. Alternatively, the disk guide passage may be also formed so that the disk may change the moving direction after abutting against the abutting member.

In this constitution, after the disk moves in a specific range along the inner surface of the side wall of the case main body, it abuts against the abutting member to slow down the moving speed of the disk, so that the disk coming out of the disk access can be easily caught by hand, and the disk discharge handling is easy. Or, by changing the moving direction after abutting, the disk moving speed is further lowered, while risk of spontaneous drop is avoided, and the disk discharge safety is enhanced.

By forming the disk access from one end face of four end faces of the case main body to other end face adjacent to this end face, the disk can be taken out in the width of the cartridge nearly equal to the disk diameter by the rotary lid type, and dead space is nearly eliminated in the cartridge, and the width is same as that of the ordinary cartridge not capable of taking the disk, so that it may be easy to be compatible.

By forming the abutting member by using an elastic member that can be deformed elastically, the disk can be held by hand after once gripping and holding the moving disk by the abutting member, so that controllability and safety in disk discharge may be enhanced.

By forming such abutting member in the lid, or using the lid also as the abutting part, the abutting position of the disk and abutting member can be set outside of the case main body, and the disk can be stopped once when popping out of the case main body, so that the disk can be held by hand more easily.

When the disk reaches the position of abutting against the disk stopping member as the abutting member, the disk can pass as being pressed and deformed by abutting against the disk, and adding such disk stopping member made of elastic member to the lid, the discharged disk can be held lightly at the position to be received by hand, so that the disk can be taken out more easily.

By providing the lid with a lock member for fixing and holding the lid by engaging with the case main body and thrusting means for turning in the lid opening direction when the engagement of the case main body and lock member is cleared, and using the thrusting means also as the abutting member made of elastic member, the opening and closing operation of the lid and the handling efficiency for taking out the disk can be enhanced.

Moreover, by forming a notch capable of observing the central hole of the disk when the disk is at the position abutting against the abutting member, in the case main body, the disk can be taken out by putting finger into the central hole of the disk, and the disk can be taken out more easily, and the disk is not stained with fingerprint or the like. On the other hand, by providing a handle for closing such notch in the lid, the strength of the lid can be increased, and the lid can be opened and closed easily.

Still more, to fit and fix the case main body and lid, by forming a concave part or penetration lid in one of the case main body and lid and forming a convex part to be fitted into the concave part or penetration hole in the other, and forming the convex part integrally with the case main body or lid so as to be folded and removed from outside, the convex part is eliminated in the cartridge from which the disk is once taken out, and it can be distinguished visually and unnecessary confusion can be avoided. Or, as the device detects presence or absence of convex part, it can be judged whether the disk has been ever taken out of the cartridge or not, and the discharged disk may be, for example, inspected and the disk quality assurance can be judged. By forming the convex part on both sides of the case main body, one of the convex parts may be always positioned on the detector of the device, so that it can be applied to two-sided disk.

By forming a moving piece for write-inhibit integrally in the lid, the disk can be taken out easily in the cartridge having write-inhibit hole.

By forming a gripping member to be engaged with upper and lower halves in the lid, lifting of the upper and lower halves near the disk access can be prevented, and therefore the strength and dimensional precision of the cartridge may be assured easily. Still more, by forming a stopping clasp at a free end of the griping member which can be deformed elastically, it is possible to assemble by inserting the gripping member into the upper and lower halves from above, so that the assembling efficiency is enhanced.

In the foregoing embodiment, when the disk is taken outside, an abutting member to abut against the outer circumferential end of the disk is provided, but not limited to this, for example, it may be composed to suppress or stop the move of the disk by using magnetic force, and in short it is enough as far as means for suppressing or stopping the move is provided for suppressing or stopping the move, when the disk is taken outside from the case main body through the disk access, after the move has moved a specific distance toward outside.

Figure 15:
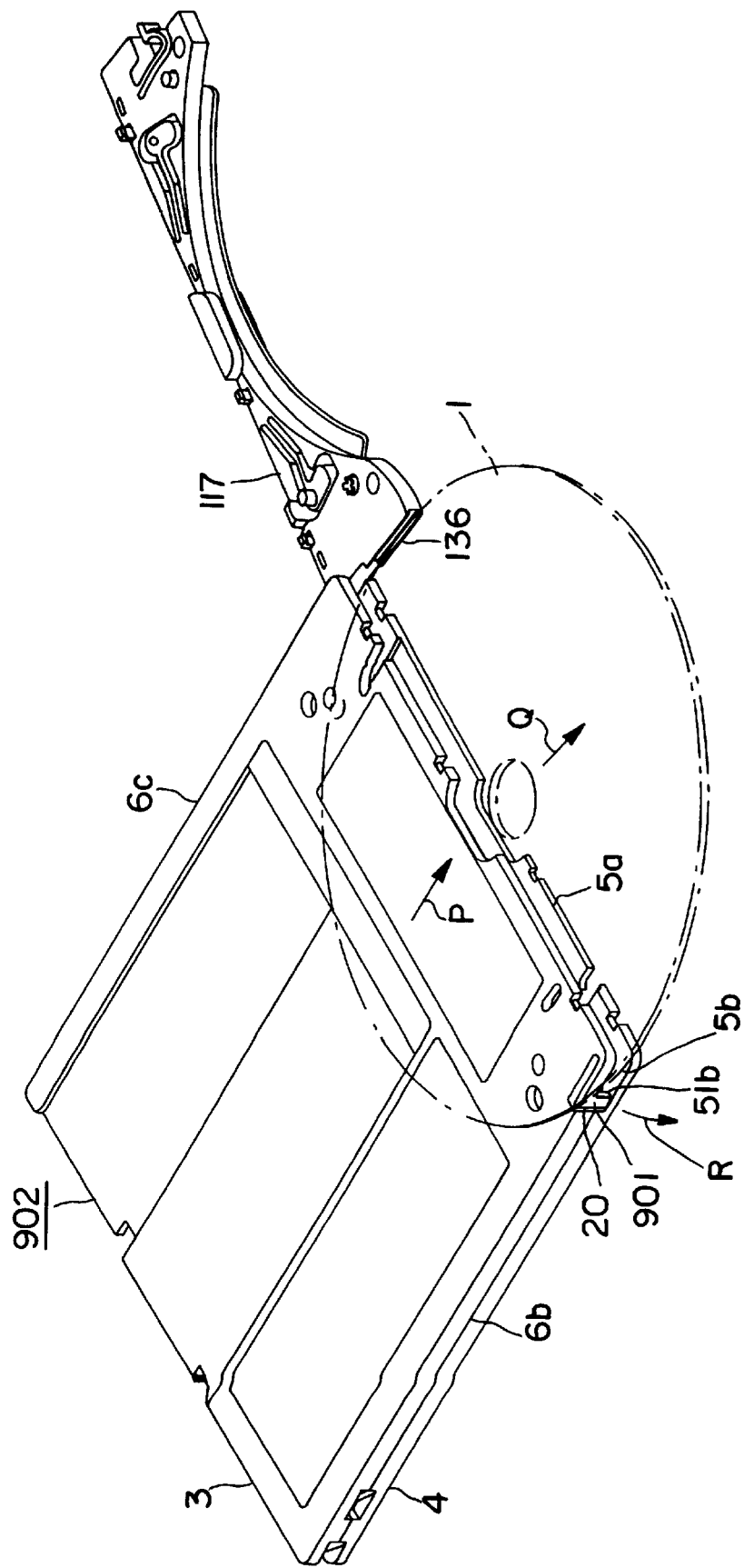
FIG. 15 is a perspective appearance view of the cartridge in open lid state of a cartridge in other embodiment of the invention.

In the foregoing embodiment, when the disk is taken outside, the abutting part to abut against the outer circumferential end of the disk simultaneously is provided one each at the lid side and the case main body side, that is, two in total, and only the abutting member at the lid side is designed to be deformed elastically, but not limited to this, for example, as shown in FIG. 15, only the abutting member at the case main body may be designed to be deformed elastically, or the both may be deformed elastically. Or three or more abutting members may be provided. Herein, the difference from the foregoing embodiment is described while referring to FIG. 15. That is, an abutting part (elastic stopping member) 901 is formed integrally on the upper half 3, being provided at the side wall 6b side of a main body case 902, a part of it serves as the inner circumferential end 51*b* of the opening 5*b*. When the outer circumferential end of the disk 1 abuts against the abutting part 901, the abutting part 901 is elastically deformed toward the direction of R shown in FIG. 15. A gap is provided between the abutting part 901 and side wall 6*b*, and this gap forms the pawl hole 20. A lid 117 is not provided with resin spring 22 (see FIG. 13) explained in the foregoing embodiment, and a disk guide groove 136 longer in overall length than the disk guide groove 36 shown in FIG. 13 is formed. In such constitution, as shown in FIG. 15, the outer circumferential end of the disk 1 taken outside from the case main body 902 abuts simultaneously against the elastic deforming abutting part 901 provided at the case main body side and the disk guide groove 136, and is held temporarily by the restoring force of the abutting part 901. Therefore, the same effects as in the foregoing embodiment are exhibited.

In the foregoing embodiment, when the device is taken outside, the abutting part for abutting against the outer circumferential end of the disk at the same time once stops the move of the disk and holds the disk temporarily, but not limited to this, for example, if the restoring force produced when the abutting part is deformed elastically when abutting simultaneously against the outer circumferential end of the disk is not so strong as to stop the move of the disk, it may be enough as far as the move of the disk is suppressed by the restoring force. In such constitution, when taking the disk out of the case main body, the move of the disk cannot be stopped as in the foregoing embodiment, but the abutting part abuts against the outer circumferential end of the disk and the moving speed of the disk is lowered by its restoring force, and therefore the disk can be taken more easily than before and the disk surface is not stained with fingerprint.

Figure 16:
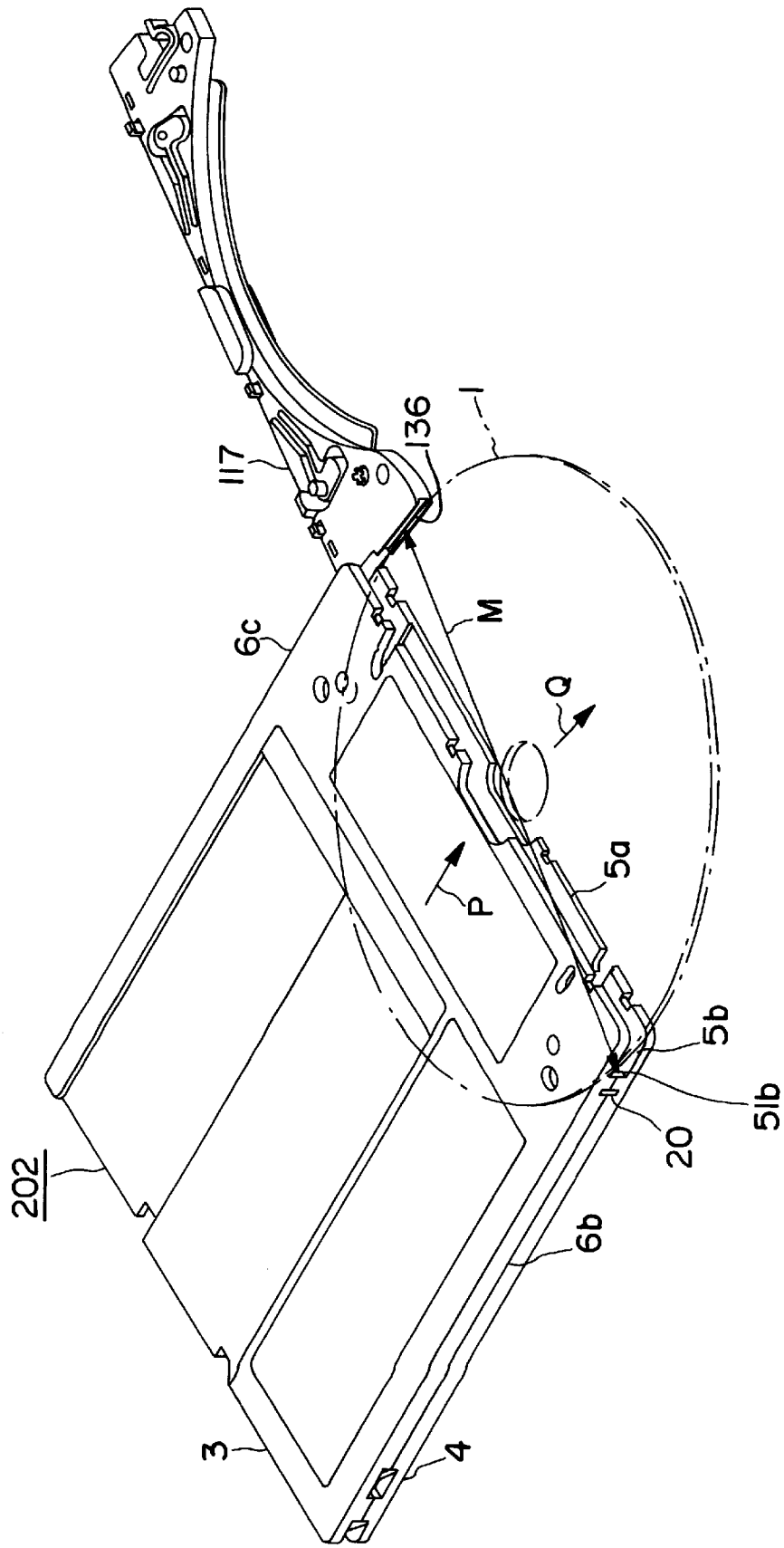
FIG. 16 is a perspective appearance view of the cartridge in open lid state of a cartridge in a different embodiment of the invention.
Figure 17:
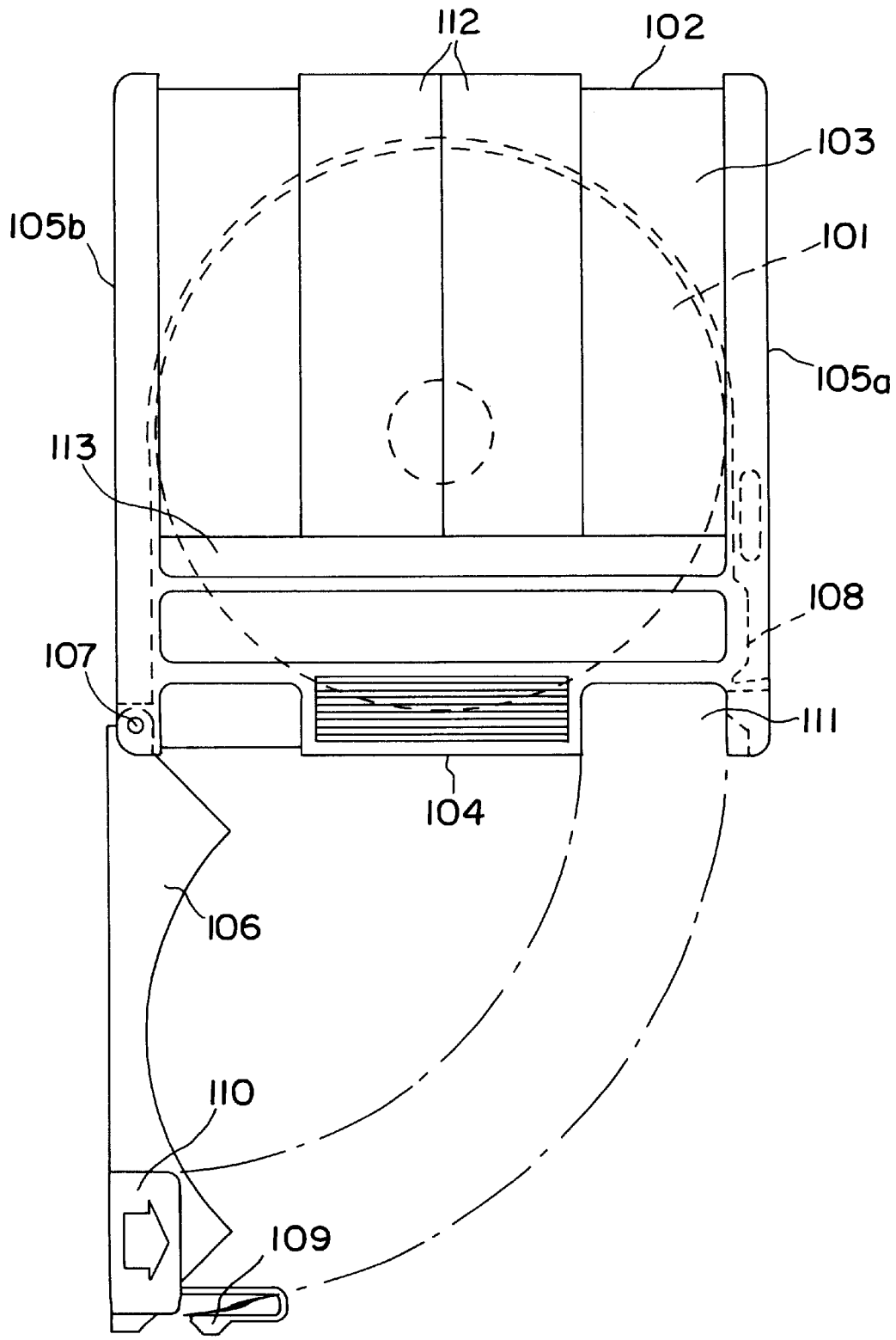
FIG. 17 is a plan view of a conventional cartridge capable of taking out a disk.

In the foregoing embodiment, at least two abutting parts including one abutting part that can be deformed elastically are provided, but not limited to this, for example, the abutting part may not be necessarily deformed elastically. That is, in such a case, as shown in FIG. 16, when the disk is taken outside, at least one abutting part is provided to abut against the outer circumferential end of the disk substantially from one side, and when the outer circumferential end of the disk abuts against the abutting part, there may be no abutting part on its outer circumferential end aside from this abutting portion. The difference between such structure and the foregoing embodiment is explained by reference to FIG. 16. As shown in FIG. 16, a lid 117 is not provided with resin spring (see FIG. 13) as explained in the foregoing embodiment, but a disk guide groove 136 same as shown in FIG. 15 is formed. On the other hand, a case main body 202 is not provided with an elastic deforming abutting part 901 as explained in FIG. 15, but an opening 5*b* is provided in part of the side wall 6*b* same as in the foregoing embodiment (see FIG. 2). As already explained in FIG. 13, distance M (see FIG. 16) from the inner circumferential end 51*b* of the opening 5*b* to the bottom of the disk guide groove 136 is set slightly larger than the diameter of the disk 1. The setting position of this distance M is the point of narrowest gap in the path of passing of the disk 1. In such constitution, the operation is as follows. The lid 117 is turned as shown in FIG. 16, and the lid 117 is opened to the maximum turning position. In this state, when the case main body 202 is inclined, the disk 1 contained in the disk accommodating part 8 is guided along straight lines 7*b*, 7*c* of the inner wall 7 by the action of gravity, and begins to move straightly toward the disk access 5 as indicted by arrow P in FIG. 16, and it is discharged outside of the case main body 202 through the disk access 5. At the time of this discharge action, one side of the outer circumferential end of the disk abuts against the bottom of the disk guide groove 136 of the lid 117. The disk 1 changes the moving direction from direction P to direction Q along its bottom, and the moving speed drops. In this way, at the time of taking out the disk, since the discharge speed of the disk once stops, the disk can be taken out more easily than before, and deposit of fingerprint on the disk surface can be avoided. Incidentally, one side of the outer circumferential end of the disk 1 does not abut against the inner circumferential end 51*b* when moving in direction Q along the disk guide groove 136 of the lid 117. However, depending on the manner of inclination of the case main body 202, the outer circumferential end of the disk may abut against the inner circumferential end 51*b* of the opening 5*b*, but even in such a case, actually, the inner circumferential end 51*b* and the bottom of the disk guide groove 136 do not abut simultaneously against the outer circumferential end of the disk.

In the foregoing embodiment, the disk access is extended from one side wall out of four side walls of the case main body to other side wall adjacent to this side wall, but not limited to this, for example, if there is an allowance in the width dimension of the cartridge, the disk access may be formed in one side wall only.

In the foregoing embodiment, the elastic deforming abutting member (resin spring 22) that abuts against the disk when taking out the disk is used also as the thrusting means of the lid 17, but not limited to this, for example, the both functions may be provided independently without sharing.

In the foregoing embodiment, the central hole 1*a* of the disk is visible through the notch 12 of the case main body 2 when the disk is temporarily held in the abutting part, but not limited to this, for example, the end portion of the upper half 3 corresponding to the side wall 6*a* side of the case main body 2 may be dented in an arc form toward the central part of the case main body 2, that is, as far as the abutting part is composed so that the central hole of the disk is exposed outside from the case main body when the disk is at the position abutting against the abutting part, the shape of the case main body side is not particularly specified.

In the foregoing embodiment, the write-inhibit means is provided in the disk cartridge having the abutting part for suppressing or stopping the disk move, but not limited to this, for example, the write-inhibit means may be provided in the disk cartridge not having abutting part. In this case, the disk cartridge capable of taking out the disk comprises a case main body of a substantially rectangular form having a disk accommodating part for accommodating a data recording disk, and an opening provided so that disk driving means for rotating and driving the accommodated disk can be inserted into the disk accommodating part from outside, shutter means having a shielding plate for opening and closing the opening, a disk access provided at an end surface of the case main body to communicate with the disk accommodating part so that the disk can be taken in and out, a lid for opening and closing the disk access, and write-inhibit means formed on the lid for preventing accidental erasure of the recorded data on the disk at the time of recording operation into the disk. Moreover, the write-inhibit means possesses a movable protrusion formed integrally on the lid, and a write-inhibit hole corresponding to the movable range of the protrusion formed on the case main body, and the protrusion is held at predetermined position showing record forbid or record enable state, depending on the convex or concave part provided at the inner side of the write-inhibit hole.

In this way, the write-inhibit means is provided at least in the lid and is formed integrally with the lid, the write-inhibit means does not impede when taking out the disk, and the write-inhibit function can be realized in a simple structure.

In the foregoing embodiment, in the disk cartridge having an abutting part for suppressing or stopping the move of the disk, the disk access is extended from one end surface to other end surface adjacent to this end surface, out of substantially four end surfaces (that is, side walls) of the case main body, but not limited to this, for example, the disk access of such structure may be formed in the disk cartridge not having such abutting part. In this case, the disk cartridge capable of taking out the disk comprises a case main body of a substantially rectangular form having a disk accommodating part for accommodating a data recording disk, and an opening provided so that disk driving means for rotating and driving the accommodated disk can be inserted into the disk accommodating part from outside, shutter means having a shielding plate for opening and closing the opening, a disk access provided at an end surface of the case main body to communicate with the disk accommodating part so that the disk can be taken in and out, and a lid for opening and closing the disk access, wherein the disk access is extended from one end surface to other end surface adjacent to this end surface, out of substantially four end surfaces of the case main body. Therefore, the width of the case main body 2 may be set at 124 mm, and in spite of the outer dimension close to 120 mm which is the diameter of the disk, the disk cartridge capable of taking out the disk can be composed by using a rotary disk.

In the foregoing embodiment, the lid is of rotary type, but not limited to this, for example, the lid may be of detachable type. In this case, of courses, the abutting part is provided at the case main body side.

What is claimed is:

1. A disk cartridge adapted for permitting the removal of a disk comprising:

a case of a substantially rectangular form having a disk accommodating part for accommodating a data recording disk, an opening provided so that disk driving means for rotating and driving the accommodated disk can be inserted into the disk accommodating part from outside, shutter means having a shielding plate for opening and closing the opening, a disk access provided at an end surface of the case to communicate with the disk accommodating part so that the disk can be inserted and removed, a lid having positions for opening and closing the disk access, a movable protrusion for preventing accidental erasure of recorded data on the disk at the time of recording into the disk, said movable protrusion being formed integrally in the lid, and a write-inhibit hole corresponding to a movable range of the movable protrusion, said write-inhibit hole being formed in the case, wherein a portion having said write-inhibit hole forms part of the case when the lid is set at each of the positions for opening and closing the disk access, and the movable protrusion is maintained at a predetermined position indicating one of record inhibit and record enable states, depending on at least one of a convex and a concave part provided at an inner side of the write-inhibit hole.

2. A disk cartridge adapted for permitting the removal of a disk of claim 1, wherein the movable protrusion extends from the lid in a direction orthogonal to the movable range of the movable protrusion.

3. A disk cartridge adapted for permitting the removal of a disk of claim 1, further comprising clasping means formed integrally in the lid to prevent an upper portion of the case separating from a lower portion of the case when the lid is in a closed position.

4. A disk cartridge adapted for permitting the removal of a disk of claim 1, wherein the movable protrusion engages the case when the lid is in a closed position and disengages with the case when lid is in an open position.

5. A disk cartridge adapted for permitting the removal of a disk of claim 1, further comprising a second protrusion formed in the lid to engage with the case when lid is in a closed position to prevent the movable protrusion from moving beyond an end of the case.

6. A disk cartridge having two parallel broad surfaces and four narrow end surfaces, the disk cartridge adapted for permitting the removal of a disk comprising:

a case of a substantially rectangular form having a disk accommodating part for accommodating a disk, and having an opening provided so that disk driving means for rotating and driving the accommodated disk can be inserted into the disk accommodating part from outside, shutter means having a shielding plate for opening and closing the opening, a disk access opening provided at an end surface of the case to communicate with the disk accommodating part so that the disk can be inserted and removed, a lid having positions for opening and closing the disk access opening, the lid including a hinge point, and the disk access opening extending from one end surface to another end surface adjacent to the one end surface, out of substantially the four end surfaces of the case, the disk access opening including at least a portion of the one end surface and the other end surface, the other end surface opposite the hinge point of the lid.

7. A disk cartridge adapted for permitting the removal of a disk of claim 6, in which a wall forms a major portion of the another end surface of the case and the disk access includes an opening between the wall and the one end surface.

* * * * *